UNITED STATES PATENT OFFICE.

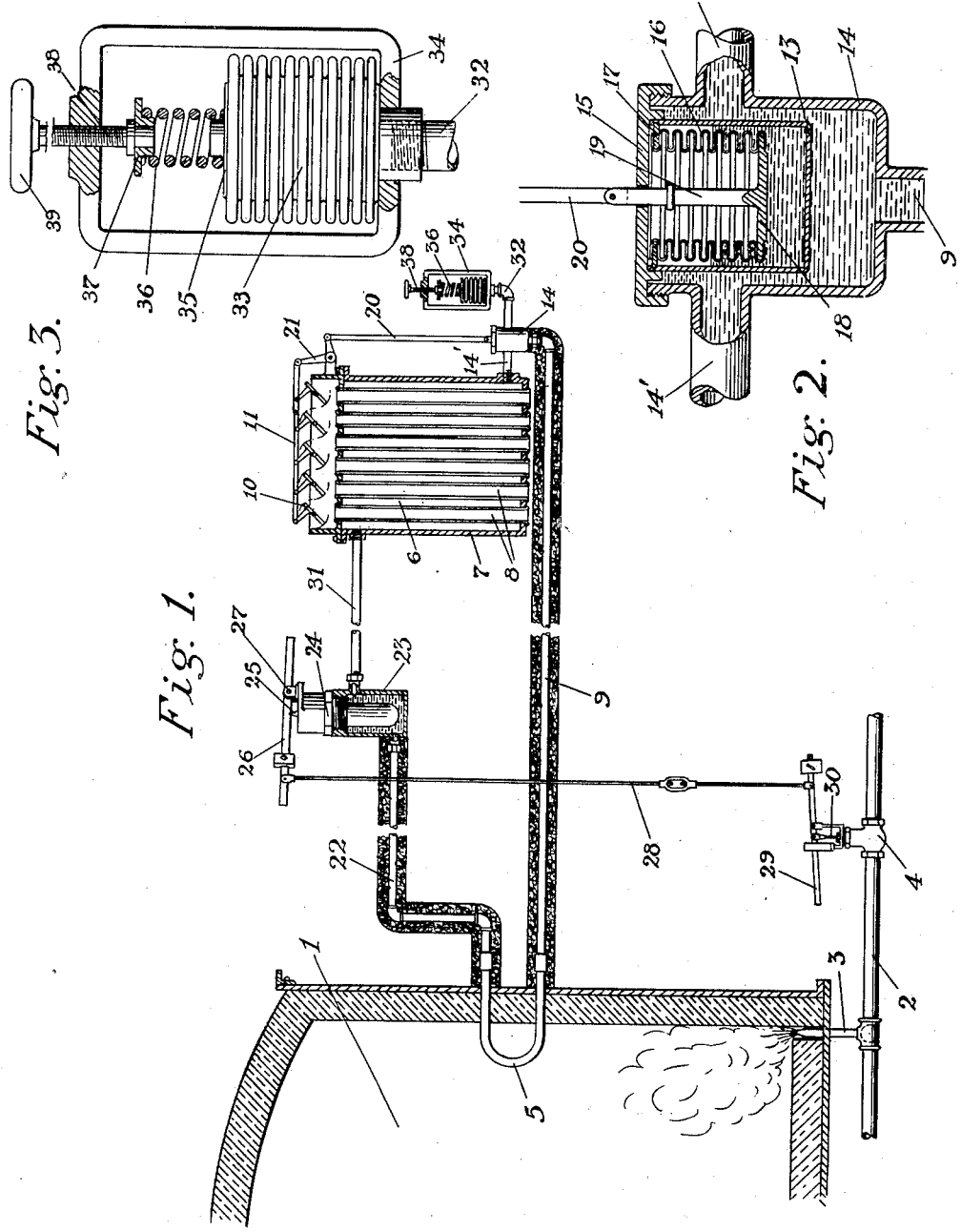

WESTON M. FULTON, OF KNOXVILLE, TENNESSEE, ASSIGNOR TO THE FULTON COMPANY, OF KNOXVILLE, TENNESSEE, A CORPORATION OF MAINE.

TEMPERATURE-REGULATOR.

1,358,072.         Specification of Letters Patent.       Patented Nov. 9, 1920.

Application filed August 24, 1916. Serial No. 116,729.

*To all whom it may concern:*

Be it known that I, WESTON M. FULTON, a citizen of the United States of America, and a resident of Knoxville, Tennessee, have invented a new and useful Improvement in Temperature-Regulators, which invention is fully set forth in the following specification.

This invention relates to regulating means, which are responsive to temperature variations and, while capable of a wide variety of uses, it has especial utility when used for the regulation of moderately high temperatures.

It is an object of this invention to provide a regulator whereby means may be controlled by a thermostat not subjected directly to the source of heat but subjected to a fluid circulated in heat-interchanging relation to the source of heat and having a definite temperature relation thereto, so that temperatures may be regulated above those to which the thermostat may be directly exposed.

A further object of this invention is to take advantage of the known law that a fluid brought to a constant temperature, and then circulated at a given rate in operative or heat-interchanging relation to a source of heat, will acquire a definite temperature, less than that of the source of heat but bearing a proportionate relation thereto, and to utilize this law in the regulation of moderately high temperatures.

Still another object of this invention is to provide a regulator that is accurate and sensitive in regulating the temperature of a source of heat.

Stated briefly, the invention comprises in combination with a source of heat and a means to be controlled, thermostatic apparatus for controlling said means comprising a local system for circulating a fluid in operative or heat-interchanging relation to said source of heat, said fluid being subjected to a temperature substantially different from that of said source of heat before subjection to the latter and means being preferably provided in said system whereby said fluid is brought to said substantially uniform temperature before the same is subjected to the source of heat, and thermosensitive means controlled by the temperature of the fluid after being subjected to said source of heat. The means for bringing the fluid to a substantially uniform temperature may be of any suitable nature and preferably comprises means, as a radiator, the function of which is thermostatically controlled by the temperature of the fluid. The system also preferably comprises an expansion chamber for the fluid and means for subjecting the fluid to a substantially uniform pressure.

The invention is capable of receiving a variety of mechanical expressions, two of which, for the purpose of illustration, have been shown on the accompanying drawings. But it is to be expressly understood that these drawings are for purposes of illustration only, and are not to be construed as a definition of the limits of the invention, reference being had to the appended claims for that purpose.

Referring to the drawings, wherein the same reference characters designate corresponding parts in the several figures, Figure 1 is a schematic elevation, partly in section, illustrating an embodiment of the invention applied to the regulation of the temperature in a gas furnace;

Fig. 2 is a detail of the thermosensitive means shown for controlling the cooling effect of the radiator;

Fig. 3 is a detail of the expansion chamber and pressure applying means;

Figure 4:
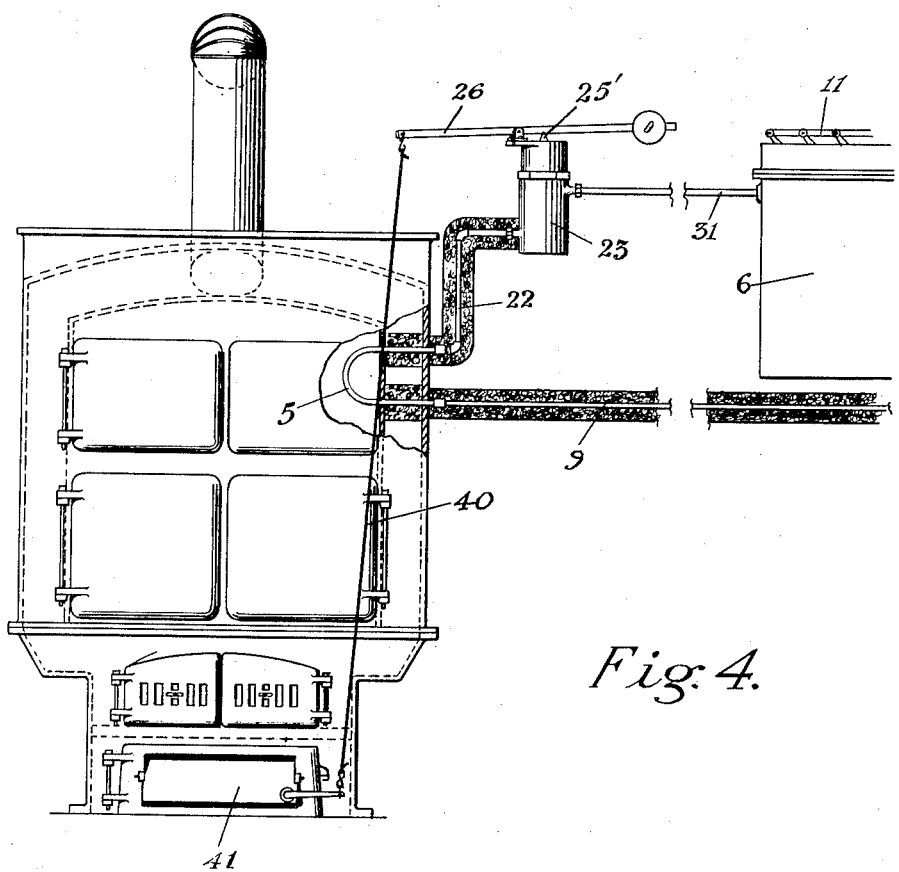
Fig. 4 is a schematic elevation, partly in section, illustrating an embodiment of this invention applied to the regulation of the temperature in a furnace for burning coal or similar fuel.

Referring in detail to Fig. 1, 1 represents a source of heat such, for example, as a furnace. 2 represents a conduit for supplying fuel, whether liquid or gas, to the furnace, and 3 indicates diagrammatically a burner. A valve is provided in the conduit 2, as indicated at 4, and this valve may be of any suitable type, as a throttle valve or a snap valve, it being understood in the latter case that a by-pass would be provided around the said valve to communicate with a pilot light.

Means are provided in accordance with this invention for circulating, in any suitable way, in operative or heat-interchanging relation with the heat within the furnace 1, a suitable fluid such, for example, as water. In the form shown the fluid is passed through a conduit 5 positioned within and exposed to the heat of the furnace. Means are also provided whereby said fluid is brought to a substantially uniform temperature before the same is subjected to the heat of the furnace, such means preferably comprising a heat-dissipating device, such as a radiator, as generally indicated at 6. In the form shown a casing 7, through which the fluid circulates is provided with a plurality of tubes 8 through which a cooling medium, such as air, may flow, the tubes 8 being entirely surrounded by the fluid of the system so that convectional currents of air through such tubes will be sufficient to bring the fluid of the system to the desired uniform temperature under the most adverse conditions. From the radiator 6 the fluid flows to the conduit 5, as by a conduit 9, the circulation being forced, as by a pump, or thermosiphonic as conditions may require.

Means are shown for regulating the operation of said heat-dissipating device for bringing the fluid of the system to a substantially uniform temperature, such regulating means preferably taking the form of a device thermosensitively controlled by the temperature of the fluid in the system. While any suitable means for bringing said fluid to a predetermined temperature may be employed, in the illustrated embodiment of the invention the radiator 6 is provided with a damper shown as a plurality of shutters 10 respectively connected to an operating bar 11 and adapted to regulate the quantity of air flowing through the radiator. This damper is preferably controlled by thermosensitive means subjected to the temperature of the fluid flowing through the system. While any suitable thermosensitive means may be employed, the illustrated construction comprises a container 13 positioned within a tank-like enlargement 14 connected to the radiator by a conduit 14', and communicating with conduit 9, said container and tank-like enlargement being closed by a cover 15. Within the container 13 is an expansible and collapsible vessel 16 having one end secured to a fixed annular plate 17 in the top of the container, and having its other end closed by a rigid movable end wall 18. The space within the container 13 exterior to the vessel 16 is charged with a thermosensitive volatile fluid. Extending upwardly from the rigid end wall 18 is a stem 19 operatively connected to the damper heretofore described, as by a link 20 and a bell-crank lever 21. Other suitable means, preferably thermostatically controlled, may however be used for bringing said fluid to a substantially uniform temperature.

The fluid in the system, after circulating in operative or heat-interchanging relation to the source of heat through conduit 5, flows in its heated condition through conduit 22 into operative relation to thermosensitive means which is in turn operatively related to the means to be controlled, in the present embodiment the valve in the housing 4. To this end the system is shown as provided with an enlargement 23 through which the fluid flows, and within this enlargement 23 is positioned the aforesaid thermosensitive means. While any suitable form of thermosensitive means may be employed, the preferred construction comprises a thermostat of the general type illustrated in my Patent No. 1,153,214, dated September 14, 1915. This thermostat 24 has an operating stem 25 in engagement with a weighted lever 26 pivoted on a bracket 27 extending from the casing of the thermostat. In the form shown, an extensible link 28 connects the weighted lever 26 with a second weighted lever 29 operatively connected with the valve stem 30 controlling the valve within the casing 4. From the enlargement 23 containing the thermostat 24 the fluid returns to the cooling means by a conduit 31.

The system is also preferably provided with means constituting an expansion chamber for the fluid therein. To this end an elbow tube 32 in communication with the system is shown as leading to an expansion chamber 33. While any suitable form of expansion chamber may be employed, the illustrated embodiment comprises an expansible and collapsible vessel having one end fixedly secured to a frame 34 supported on the elbow 32 and having a movable end wall 35 at its opposite end. Means are also preferably provided whereby the fluid in the system may be subjected to an initial pressure. Especially if the fluid be water, means should be provided to subject the same to sufficient pressure to prevent formation of steam in the system as the fluid flows through the conduit 5. Any suitable form of pressure applying means may be employed, the illustrated embodiment comprising adjustable resilient means in the form of a coil spring 36 bearing at one end upon the movable end wall 35 of the expansion chamber, and engaging at its opposite end with a block 37 on the end of an adjusting screw 38 threaded through the aforesaid frame 34 and provided with an operating wheel, as indicated at 39.

To prevent a loss of heat by the fluid in the system between the conduit 5 and enlargement 23, conduit 22 may be lagged. Similarly, to prevent an increase in temperature between the radiator 6 and the conduit 5, conduit 9 may be lagged.

Referring to Fig. 4, the invention is illustrated as embodied in a means for regulating the draft of a furnace employing a solid fuel. The description of the embodiment of Fig. 1 applies equally to the construction of Fig. 4, except that the weighted lever 26 is connected by an operating member, as a cord 40, to a draft regulator 41. While the illustrated embodiment shows this regulator as controlling the draft at its intake, it will be understood that the invention is equally applicable to the control of a damper in a pipe or chimney leading from the furnace.

In operation, the fluid in the system is brought to a substantially uniform temperature in the radiator 6, the cooling effect of which is automatically regulated by the temperature of the fluid, through the thermostat 13, 16 and its operative connections with the damper regulating the flow of air through the radiator. It will be observed that the container 13 is entirely surrounded by the fluid as it flows from the radiator. Any increase in temperature in such fluid will produce a volatilization of the thermosensitive fluid within this container, increasing the pressure on the movable end wall 18 of the collapsible and expansible vessel 16, and proportionately opening the shutters 10. Conversely, any decrease in the temperature of such fluid will result in a proportionate closing of said shutters. The fluid brought to the predetermined temperature flows through the conduit 9 and into operative or heat-interchanging relation to the source of heat, by flowing through the conduit 5, where its temperature is increased in proportion to the temperature of said source. From the conduit 5 the fluid flows to the enlargement 23, where it controls the thermostat 24, such thermostat, through its operative connections, operating the valve in the casing 4 (Fig. 1) to increase or decrease the supply of fuel to the furnace in order to maintain a substantially uniform temperature therein. From the enlargement 23 the fluid of the system returns to the radiator where it is again brought to the predetermined temperature. Any expansion of the fluid in the system results in an expansion of the vessel 33 against the tension of the spring 36, while a contraction of the fluid permits a corresponding contraction of such vessel. Thereby the fluid in the system is kept at a substantially uniform pressure. Sufficient pressure to prevent evaporation or volatilization of the fluid in the system may be obtained by an initial pressure imposed on the movable end wall 35 of the vessel 33 by adjusting screw 38 and spring 36.

While the invention has been illustrated as embodied in constructions for the regulation of moderately high temperatures, it is to be understood that the invention is equally applicable to the regulation of other temperatures, the invention, however, having special utility in the regulation of moderately high temperatures. Furthermore, as low temperatures are but representative of an absence of heat, it will be apparent that the invention is equally applicable to the regulation of low temperatures, as well as high temperatures, by substituting for the radiator a heater to bring the fluid of the system to a substantially uniform temperature. In the latter event, end 5 would be the cold end, and there would be a determinate fall in temperature from the heater to end 5 and, therefore, to the thermosensitive means 24. Said thermosensitive means would then properly actuate the means to be controlled in accordance with the variations in temperature of the fluid subjected to the low temperatures. It is accordingly to be expressly understood that the term "source of heat", when used in the claims, is to be construed as covering heat conditions representing either high or low temperatures.

While the invention has been disclosed as applied to the control of combustion in a furnace consuming a combustible fuel, it is also apparent that it is equally capable of use for the control of any other type of furnace as, for example, by operation of the rheostat of an electric furnace.

What is claimed is:

1. In combination with a source of heat and means to be controlled, thermostatic apparatus for controlling said means comprising a local system for circulating a fluid in operative relation to said source of heat, means in said system for bringing said fluid to a substantially uniform temperature before subjection thereof to said source of heat, and thermosensitive means controlled by said fluid after subjection thereof to said source of heat, said last-named means being operatively related to said means to be controlled.

2. In combination with a source of heat and means to be controlled, thermostatic apparatus for controlling said means comprising a local system for circulating a fluid in operative relation to said source of heat, means in said system whereby said fluid is subjected to a temperature substantially different from that of said source of heat before subjection to the latter, and thermosensitive means controlled by said fluid after subjection to said source of heat, said last-named means being operatively related to said means to be controlled.

3. In combination with a source of heat and means to be controlled, thermostatic apparatus for controlling said means comprising a local system for circulating a fluid in operative relation to said source of heat, means in said system for bringing said fluid to a substantially uniform temperature before subjection thereof to said source of heat, thermosensitive means controlled by said fluid after subjection to said source of heat, said last-named means being operatively related to said means to be controlled, and means for applying pressure to the fluid in said system.

4. In combination with a source of heat and means to be controlled, thermostatic apparatus for controlling said means comprising a local system for circulating a fluid in operative relation to said source of heat, means in said system for bringing said fluid to a substantially uniform temperature before subjection thereof to said source of heat, thermosensitive means controlled by said fluid after subjection to said source of heat, said last-named means being operatively related to said means to be controlled, and adjustable resilient means for applying pressure to the fluid in said system.

5. In combination with a source of heat and means to be controlled, thermostatic apparatus for controlling said means comprising a local system for circulating a fluid in operative relation to said source of heat, means in said system for bringing said fluid to a substantially uniform temperature before subjection thereof to said source of heat, thermosensitive means controlled by said fluid after subjection to said source of heat, said last-named means being operatively related to said means to be controlled, and a fluid-expansion chamber in said system.

6. In combination with a source of heat and means to be controlled, thermostatic apparatus for controlling said means comprising a local system for circulating a fluid in operative relation to said source of heat, means in said system for bringing said fluid to a substantially uniform temperature before subjection thereof to said source of heat, thermosensitive means controlled by said fluid after subjection to said source of heat, said last-named means being operatively related to said means to be controlled, and a fluid-expansion chamber in said system comprising an expansible and collapsible vessel having a movable end wall and communicating with said system.

7. In combination with a source of heat and means to be controlled, thermostatic apparatus for controlling said means comprising a local system for circulating a fluid in operative relation to said source of heat, means in said system for bringing said fluid to a substantially uniform temperature before subjection thereof to said source of heat, thermosensitive means controlled by said fluid after subjection to said source of heat, said last-named means being operatively related to said means to be controlled, an expansible and collapsible vessel having a movable end wall and communicating with said system, and an adjustable spring opposing movement of said movable end wall.

8. In combination with a source of heat and means to be controlled, thermostatic apparatus for controlling said means comprising a local system for circulating a fluid in operative relation to said source of heat, means in said system and comprising a radiator for bringing said fluid to a substantially uniform temperature before subjection thereof to said source of heat, and thermosensitive means controlled by said fluid after subjection to said source of heat, said thermosensitive means being operatively related to said means to be controlled.

9. In combination with a source of heat and means to be controlled, thermostatic apparatus for controlling said means comprising a local system for circulating a fluid in operative relation to said source of heat, means in said system for bringing said fluid to a substantially uniform temperature before subjection thereof to said source of heat, thermosensitive means for regulating said last-named means, and thermosensitive means controlled by said fluid after subjection to said source of heat, said last-mentioned thermosensitive means being operatively related to said means to be controlled.

10. In combination with a source of heat and means to be controlled, thermostatic apparatus for controlling said means comprising a local system for circulating a fluid in operative relation to said source of heat, means in said system for bringing said fluid to a substantially uniform temperature before subjection thereof to said source of heat, means automatically controlled by the temperature of said fluid for regulating said last-named means, and thermosensitive means controlled by said fluid after subjection to said source of heat, said thermosensitive means being operatively related to said means to be controlled.

11. In combination with a source of heat and means to be controlled, thermostatic apparatus for controlling said means comprising a local system for circulating a fluid in operative relation to said source of heat, means in said system and comprising a radiator for bringing said fluid to a substantially uniform temperature before subjection thereof to said source of heat, thermosensitive means for regulating the flow of cooling medium through said radiator, and thermosensitive means controlled by said fluid after subjection to said source of heat, said last-mentioned thermosensitive means being operatively related to said means to be controlled.

12. In combination with a source of heat and means to be controlled, thermostatic apparatus for controlling said means comprising a local system for circulating a fluid in operative relation to said source of heat, means in said system and comprising a radiator for bringing said fluid to a substantially uniform temperature before subjection thereof to said source of heat, means automatically controlled by the temperature of said fluid for regulating the flow of cooling medium through said radiator, and thermosensitive means controlled by said fluid after subjection to said source of heat, said thermosensitive means being operatively related to said means to be controlled.

13. In combination with a source of heat and means to be controlled, thermostatic apparatus for controlling said means comprising a local system for circulating a fluid in operative relation to said source of heat, means in said system and comprising a radiator for bringing said fluid to a substantially uniform temperature before subjection thereof to said source of heat, a damper for regulating the flow of air through said radiator, thermosensitive means for controlling said damper, and thermosensitive means controlled by said fluid after subjection to said source of heat, said last-mentioned thermosensitive means being operatively related to said means to be controlled.

14. In combination with a source of heat and means to be controlled, thermostatic apparatus for controlling said means comprising a local system for circulating a fluid in operative relation to said source of heat, means in said system and comprising a radiator for bringing said fluid to a substantially uniform temperature before subjection thereof to said source of heat, a damper for regulating the flow of air through said radiator, means automatically controlled by the temperature of said fluid for controlling said damper, and thermosensitive means controlled by said fluid after subjection to said source of heat, said thermosensitive means being operatively related to said means to be controlled.

15. In combination with a furnace and means for controlling combustion therein, thermostatic apparatus for controlling said means comprising a local system for circulating a fluid in operative relation to the heat of said furnace, means in said system for bringing said fluid to a substantially uniform temperature before subjection thereof to the heat of said furnace, and thermosensitive means controlled by said fluid after subjection to the heat of said furnace, said thermosensitive means being operatively connected to said combustion-controlling means.

16. In combination with a furnace and means for controlling combustion therein, thermostatic apparatus for controlling said means comprising a local system for circulating a fluid in operative relation to the heat of said furnace, heat-dissipating means in said system whereby said fluid is brought to a temperature substantially different from that of said furnace before subjection to the heat of the latter, and thermosensitive means controlled by said fluid after subjection to the heat of said furnace, said thermosensitive means being operatively connected to said combustion-controlling means.

17. In combination with a furnace and means for controlling combustion therein, thermostatic apparatus for controlling said means comprising a local system for circulating a fluid in operative relation to the heat of said furnace, means in said system for bringing said fluid to a substantially uniform temperature before subjection thereof to the heat of said furnace, thermosensitive means for regulating said last-named means, and thermosensitive means controlled by said fluid after subjection to the heat of said furnace, said last-mentioned thermosensitive means being operatively connected to said combustion-controlling means.

18. In combination with a furnace and means for controlling combustion therein, thermostatic apparatus for controlling said means comprising a local system for circulating a fluid in operative relation to the heat of said furnace, means in said system for bringing said fluid to a substantially uniform temperature before subjection thereof to the heat of said furnace, means automatically controlled by the temperature of said fluid for regulating said last-named means, and thermosensitive means controlled by said fluid after subjection to the heat of said furnace, said thermosensitive means being operatively connected to said combustion-controlling means.

19. In combination with a furnace and means for controlling combustion therein, thermostatic apparatus for controlling said means comprising a local system for circulating a fluid in operative relation to the heat of said furnace, means in said system for bringing said fluid to a substantially uniform temperature before subjection thereof to the heat of said furnace, said last-named means comprising a radiator, means regulating the flow of cooling medium through said radiator, and thermosensitive means controlling said regulating means, and thermosensitive means controlled by said fluid after subjection to the heat of said furnace, said last-mentioned thermosensitive means being operatively connected to said combustion-controlling means.

20. In combination with a source of heat and means to be controlled, thermostatic apparatus for controlling said means comprising a local system for circulating a fluid in operative relation to said source of heat, means subjecting said fluid to a temperature substantially different from said source of heat, and thermosensitive means controlled by said fluid after subjection to said means and source of heat, said thermosensitive means being operatively related to said means to be controlled.

21. In combination with a source of heat and means to be controlled, thermostatic apparatus for controlling said means comprising a local system for circulating a fluid in operative relation to said source of heat, said system being provided with means whereby said fluid is brought to a substantially uniform temperature before the same is subjected to said source of heat, and thermosensitive means controlled by the temperature of said fluid after subjection to said source of heat, said thermosensitive means being operatively related to said means to be controlled.

In testimony whereof I have signed this specification.

WESTON M. FULTON.